Dec. 9, 1952  C. P. GRAHAM  2,621,012
PLUG-TYPE VALVE
Filed Dec. 22, 1947
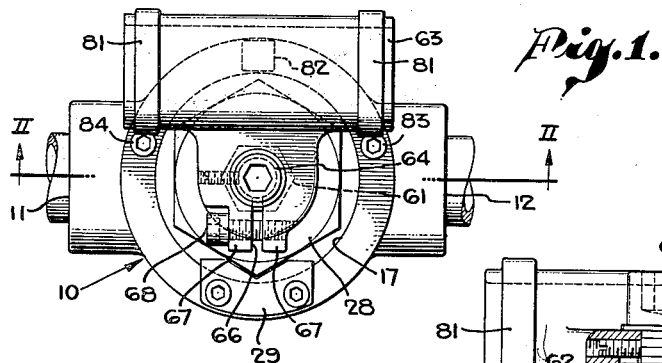
Fig. 1.
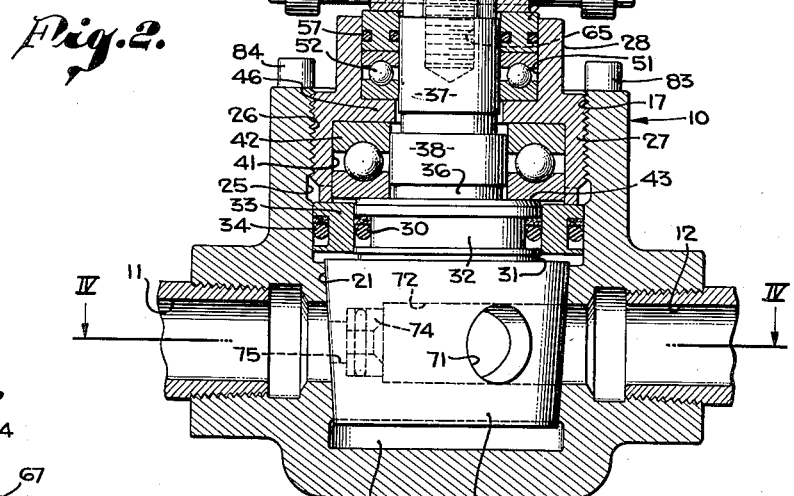
Fig. 2.
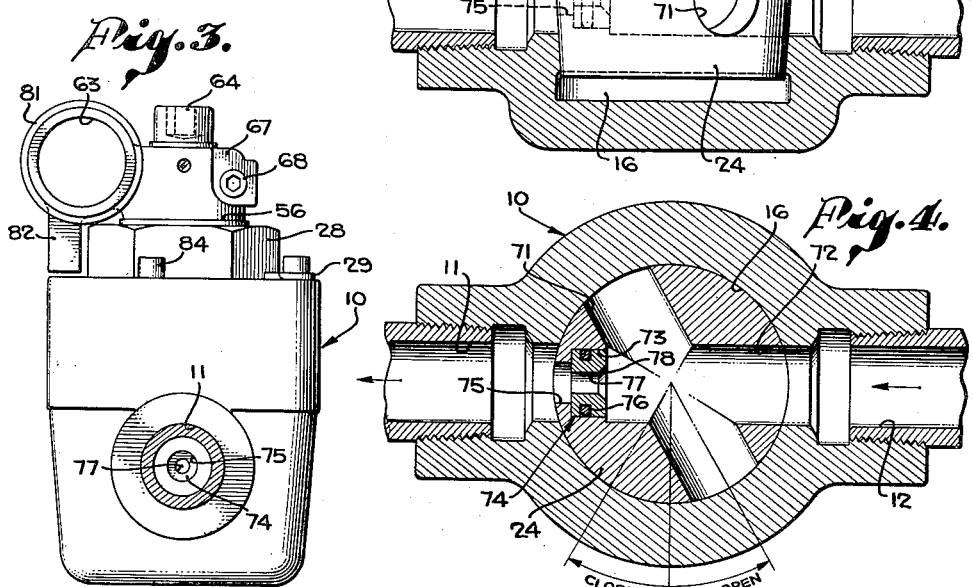
Fig. 3.
Fig. 4.
INVENTOR.
Clifford P. Graham
BY
ATTORNEY Patented Dec. 9, 1952

2,621,012

UNITED STATES PATENT OFFICE 2,621,012

PLUG-TYPE VALVE

Clifford P. Graham, Los Angeles, Calif.

Application December 22, 1947, Serial No. 793,138

4 Claims. (Cl. 251—92)

1

This invention relates to valves and, more particularly, to valves of the plug type for use in high pressure lines.

Valves for handling liquids and gases under heavy pressure have been constructed in the past in considerable variety. The plug-type valve is possessed of many structural advantages over other types of valves in view of its positive manner of operation, cheapness of construction, ease of assembly, and the fact that a relatively minimum amount of machining is necessary to fabricate them. However, with the advent of greatly increased pressures in fluid lines, such as petroleum refinery lines, lines leading from high pressure pumps to the well in oil well cementing operations, pump plants, and wherever it is necessary to employ a high pressure valve, it has been found that valves of the plug type heretofore proposed are unsatisfactory. Many of these operations are carried out at pressures of 5,000 to 10,000 lbs. per square inch. When a valve in a line carrying fluid at such pressure is opened, the rapid release of pressure gives rise to discharge of fluid at tremendous velocity, and the receiving line can be straightened, may whip or be destroyed. Furthermore, the edge areas of the valve, adjacent its seat, are scored away and destroyed. These effects are obtained with any type of valve. In attempting to overcome these dangers, attempts have been made involving a plurality of valves in series, or slight cracking of a valve to reduce the fluid pressure to a controllable range, say below 3,000 lbs. per sq. in., before further manipulation or control of flow, but no effective method or construction preventing permanent damage to the valves has been available.

It is, therefore, a primary object of this invention to provide a plug-type valve having three positions, one of which will operate as a bleeder for reducing the pressure at the valve inlet prior to opening the valve to its full open position.

Another object is to provide a bleeder insert in a fluid passageway in the plug body of a valve that may be easily removed for inspection, repair, or replacing.

A further object is to provide a three-position plug valve wherein one of the positions is smaller in area than the other positions of the valve through which fluid can pass, so that when the pressure at the intake of a valve is released, the passageway through which it is released will be insufficient to cause cutting or wear or other damage to the line in which the fluid is discharged.

An object is to provide a plug-type valve having novel means for assembling the plug within the valve whereby the plug and assembly may be readily and easily removed for inspection, repair or replacement.

A still further object is to provide a plug valve having the above characteristics, wherein the valve is provided with a wrench which operates as part of the valve assembly and provides the required leverage to actuate the plug of the valve when subject to great pressure.

Another object resides in the manner in which the valve assembly is supported by a single threaded connection within the valve body.

The above and other objects will be made apparent through the further description of the invention when taken in connection with the accompanying drawings. The invention consists in the construction, arrangement and combination of the various parts of the device whereby the objects contemplated are attained. The drawings are not, however, a definition of the invention but merely illustrate an exemplary form by means of which the invention may be effectuated.

Referring to the drawings:

Fig. 1 is a top plan view of the plug-type valve embodying the present invention.

Fig. 2 is a vertical, longitudinal, sectional view taken along the line II—II of Fig. 1.

Fig. 3 is an end elevational view taken from the left of Fig. 1.

Fig. 4 is a sectional view taken along the line IV—IV of Fig. 2.

Referring to the drawings, the device comprises a body, represented by the numeral 10, having an outlet port 11 and an inlet port 12 shown internally threaded to receive discharge and supply pipes. Within the valve body is a chamber 16 which extends transversely of the body 10, intermediate the outlet and inlet ports, and provides an opening 17 in one side of the valve body.

The lower portion of the chamber 16 is provided with a smooth conical wall surface, tapering downwardly and arranged to form a seat for a plug valve 24, portions of such tapering surface being indicated above and below the ports 11 and 12 at 21.

The opening 16 is counterbored at 25 and provided with internal threads 26 for receiving a threaded nut 27. The threaded nut 27 is provided with a hexagonal or non-cylindrical head 28 for engagement with a suitable tool for assembling nut 27 within the valve body 10. Suitable locking means 29 may be carried by the upper end of the body 10 for preventing rotation of the nut 27 within the body 10 after assembly.

The plug 24 is provided with a stepped stem, the portion 31 immediately above the plug 24 being slightly smaller in diameter than the top of plug 24 and being provided with a circumferential channel 32 arranged to receive a leather gasket and O-ring 30. The ring 30 forms a seal with a sealing ring 33 surrounding portion 31, the sealing ring 31 being provided with a circumferential groove carrying appropriate O-ring and gasket 34 for sealing with the wall of chamber 16.

The plug 24 is further reduced at 36 to provide a plug stem, represented in its entirety by 37. The stem 37 may be provided with an enlarged portion 38 arranged to receive a lower bearing 42, the bearing resting on a shoulder 43 provided between portions 36 and 31 of the plug stem 37. The nut 27 is recessed in its lower part at 41 and at 51 in its upper part, these recesses being spaced by an annular, inwardly extending flange 46, the latter forming a shoulder for limiting the upward movement of the lower bearing 42. The upper recess 51 extends upwardly through the hexagonal, integral head 28. The stem 37 extends upwardly through the recess or opening 51 and is separated therefrom by an upper bearing 52 resting on the upper side of the annular projection or flange 46.

Above the upper bearing 52 and resting thereon is provided an upper packing plate 56, the latter being positioned between the stem 37 and opposed, inner side walls of the opening 51. The packing plate 56 may be provided with a sealing ring 57 for sealing the plug stem 37 with the nut 27.

The upper end of the plug stem 37 terminates in a hexagonal shaped head 61 for engagement with a hexagonal socket 62 carried by and forming part of a tubular wrench 63. The hexagonal socket is adapted to fit over the hexagonal head 61 of the plug stem 37 and is held in fixed relation therewith by means of a vertical bolt 64 extending through a central opening in the hexagonal socket 62 and into engagement with a central, vertical, internally threaded bore in the top of the plug stem 37, as shown at 65. The socket 62 may be substantially of inverted cup shape having one side split or bifurcated, as shown at 66 (see Fig. 1). Laterally extending flanges 67 may be provided adjacent the bifurcation 63 and provided with cooperating threaded openings for receiving a threaded clamping nut, as clearly shown at 68 in the drawings. The lower rim portion of the inverted cup-shaped socket 62 rests upon the upper edge of the annular packing plate 56 so that upon threading the bolt 64 into the upper end of the plug stem 37, the head of the bolt 64 will engage opposing surfaces of the upper portion of the socket 62 and force the lower rim portions of the socket 62 in engagement with the upper edge of the packing plate 56 and simultaneously draw the plug 24 upwardly and into sealing relation with the lower surface of the lower bearing 42 and into sealing relation with the sealing ring 30. This construction, therefore, preloads bearings 42 and 52, and all forces are translated from the plug into the body through the husky nut 28 and threads 26.

The plug 24 is provided with a pair of transverse channels therethrough, as indicated at 71 and 72, respectively. Channel 71 provides a full-flow passageway means of virtually uniform diameter throughout its length and of virtually the same diameter as the inlet and outlet ports 11 and 12 in the valve body, thereby affording unobstructed flow of fluid therethrough when in open position. Channel 72 provides a bleeder passageway means having an inlet portion of virtually the same diameter as the diameter of the full-flow passageway means, and an outlet portion of stepped, reduced diameter to provide a bleeder means for facilitating opening of the valve as later described.

These channels or bores 71 and 72 intersect one another at an angle of about 50° to 70° and are arranged to selectively connect outlet and inlet ports 11 and 12 in the valve body 10. The channel 72 adjacent the outlet port is reduced at 73 for receiving a bleeder insert 74 and further reduced at 75 for connecting the opening 72 with the outlet 11. The bleeder insert 74 is made of a very hard, wear-resisting alloy and is provided with suitable outer packing, as shown at 76, and a suitable axial, reduced opening 77 having a flared portion 78 providing a passageway through the bleeder. It will be noted that the opening 77 is smaller in cross-sectional area than any cooperating opening in the valve, so that when the plug 24 is turned from closed position and approaches the bleeder position of Fig. 4, pressure fluid will not impinge upon any wearable portion or seat of the valve. When the plug 24 is in the position as shown in Fig. 4, the bleeder insert will operate to pass sufficient fluid through the opening 72 in the plug 24 for reducing pressure at the intake side of the valve sufficiently to permit the valve to be operated to full open position by aligning the opening 71 with the inlet and outlet of the valve. The bleeder insert 74 may be press fitted into the opening 73 and since the opening or bore 77 is smaller in diameter than bore 75 and presents outwardly directed annular face margins surrounding the opening 77 which are accessible from the discharge side of the bore 75, the insert 74 may be easily tapped out for inspection, repair, or replacement.

The wrench 63 may be tubular and provided with annular flanges 81 at its opposite ends for strengthening the body of the wrench, and the wrench may be actuated by inserting a pipe or other implement therethrough. The wrench is so designed that the position of the wrench indicates the position of the valve. In the present illustration, Fig. 4, the wrench is in parallel relation with the inlet and outlet of the valve, as indicated in the drawings, when the valve is in a position to bleed the intake, it only being necessary to turn the wrench 60° clockwise or counterclockwise from the position shown in the drawings, to move the valve to closed or full open positions, respectively. The wrench 62 is provided with a stop member 82 arranged to abut stop members 83 and 84 carried by the upper end of the body 10 when the valve is in fully closed and fully open positions.

Accordingly, there is provided a valve of the plug type having three positions, which consist of the usual open and closed positions, together with a bleeder position whereby the valve may be actuated for bleeding the pressure at the intake of the valve for preventing damaging of the valve or damaging of the line into which the fluid is discharged. The assembly for mounting the plug in the valve is simple and efficient and places the entire stress between the plug and the body on the threaded portion 26 connecting the nut 27 with the valve body 10. The valve in its entirety is simple, easily and quickly operated, durable, positive in action and comparatively cheap to manufacture. Since the bleeder insert 74 is removable, the only wearable part can be readily replaced.

While I have illustrated and described a single exemplary form of the device, it will now be apparent to those skilled in the art that various changes, modifications, substitutions and additions may be made in the structure illustrated and defined without departing from the spirit and scope of the appended claims.

I claim:

1. In a high pressure valve, a valve body having intake and discharge openings in alignment and provided with a chamber therein having a valve insert opening; and a valve member comprising a plug rotatably seated within the chamber, said plug having a full-flow passageway means of uniform diameter throughout its length and a bleeder passageway means intersecting said full-flow passageway means at an acute angle, said passageway means being selectively alignable with the intake and discharge openings, said bleeder passageway means including an inlet portion of virtually the same diameter as the full-flow passageway means and an outlet portion having a stepped, reduced diameter adjacent the end of the bleeder passageway means forming an annular, inwardly facing shoulder; a restrictor element seated on said shoulder and provided with a port having a diameter less than said reduced diameter and aligned with the axis of the outlet portion; and seal means for said restrictor element in said outlet portion whereby high pressure fluid passing through said bleeder passageway means positively seats said restrictor element on said shoulder and said element may be removed by pressure applied at margins of the restrictor port at the discharge side thereof.

2. In a high pressure valve, a valve body having intake and discharge openings in alignment and provided with a chamber therein having a valve insert opening; and a valve member comprising a plug rotatably seated within the chamber, said plug having a full-flow passageway means of uniform diameter throughout its length and a bleeder passageway means intersecting said full-flow passageway means at an acute angle, said passageway means being selectively alignable with the intake and discharge openings, said bleeder passageway means including an inlet portion of virtually the same diameter as the full-flow passageway means and an outlet portion having a stepped, reduced diameter adjacent the end of the bleeder passageway means forming an annular, inwardly facing shoulder; a restrictor element fitted in said outlet portion and seated on said shoulder; a port formed in said restrictor element of a diameter less than the said reduced diameter, said element having annular face margins surrounding the restrictor port accessible from the discharge side of the bleeder passageway means for facilitating removal of the restrictor element.

3. A valve of the character claimed in claim 2 wherein the port of the restrictor element is formed with an inwardly tapering intake portion.

4. In a high pressure valve, a valve body having intake and discharge openings in alignment and provided with a chamber therein having a valve insert opening; and a valve member comprising a plug rotatably seated within the chamber; said plug having full-flow passageway means of uniform diameter throughout its length and a bleeder passageway means intersecting the full-flow passageway means at an acute angle and extending therethrough along one axis, said passageway means being selectively alignable with the intake and discharge openings, said bleeder passageway means including an outlet portion having an inwardly facing shoulder adjacent the end of the bleeder passageway means and defining a reduced section of the outlet portion; and a restrictor element fitted in said outlet portion and seated on said shoulder, said restrictor element having a port of less diameter than the diameter of the reduced section of the outlet portion.

CLIFFORD P. GRAHAM.

REFERENCES CITED

The following references are of record in the file of this patent:

UNITED STATES PATENTS

| Number | Name | Date |
| --- | --- | --- |
| 512,892 | Munger | Jan. 16, 1894 |
| 926,774 | Schmidt | July 6, 1909 |
| 1,026,884 | Salmon | May 21, 1912 |
| 1,899,826 | Rice | Feb. 28, 1933 |
| 1,991,173 | Rautenstrauch | Feb. 12, 1935 |
| 2,497,139 | Rumbaugh | Feb. 14, 1950 |

FOREIGN PATENTS

| Number | Country | Date |
| --- | --- | --- |
| 784,914 | France | of 1935 |
| 791,131 | France | of 1935 |